United States Patent [19]

Malcolm

[11] 3,743,183
[45] July 3, 1973

[54] COMPRESSION SPRING SHROUD
[76] Inventor: William R. Malcolm, 314 W. San Jose, Fresno, Calif. 93704
[22] Filed: Oct. 12, 1971
[21] Appl. No.: 187,994

[52] U.S. Cl. .................................. 239/264, 239/230
[51] Int. Cl. ............,......................... B05b 3/00
[58] Field of Search .................... 239/230, 259, 261, 239/264, 280

[56] References Cited
UNITED STATES PATENTS

| | | | |
|---|---|---|---|
| 2,228,720 | 1/1941 | Coles et al. | 239/230 |
| 3,232,539 | 2/1966 | Hait | 239/264 X |
| 2,223,441 | 12/1940 | Coles et al. | 239/230 |
| 2,869,925 | 1/1959 | Crow | 239/230 |

*Primary Examiner*—M. Henson Wood, Jr.
*Assistant Examiner*—Reinhold W. Thieme
*Attorney*—William C. Babcock

[57] ABSTRACT

A shroud for enclosing a compression spring in a sprinkler bearing assembly, the bearing assembly having a unitary bearing housing and bearing sleeve, a hollow spindle rotatably received in the bearing sleeve and having ends extending beyond the sleeve, the spindle having at one end thereof a discharge member and at the other end thereof a first bearing seal, a second bearing seal disposed about the end of the sleeve adjacent to the discharge member, and the compression spring positioned about the sleeve between the second bearing seal and the bearing housing urging the spindle upwardly in the sleeve. The shroud is mounted in sealing relation to the compression spring between the second bearing seal and the bearing housing in simultaneous sealing relation therewith to shield the spring from exposure to abrasive and corrosive substances so as to minimize wearing of the second bearing seal and to preclude the introduction of such substances to the bearing assembly and is adapted to flex with the spring during oscillation and/or rotation of the discharge member so as to maintain its sealed relation with the compression spring, second bearing seal and bearing housing.

9 Claims, 4 Drawing Figures

Patented July 3, 1973

3,743,183

COMPRESSION SPRING SHROUD

BACKGROUND OF THE INVENTION

The present invention relates to sealing devices and more particularly to such a device for use on rotary fluid sprinklers which prevents abrasive and corrosive substances from attacking the operative elements of the sprinkler without inhibiting the operation of the sprinkler so as to provide for the long life of the sprinkler with a minimum of maintenance.

It is a well-known practice in the irrigable lands, particularly in the western portions of the United States, to use irrigation systems utilizing rotary fluid sprinklers. Such sprinklers have been mounted in series so as to provide overlapping spray patterns in order to irrigate the optimum area of land without leaving gaps of unirrigated land therebetween.

Conventionally, such rotary fluid sprinklers have a bearing assembly affording a compression spring which operates a system of bearing seals designed to prevent leakage of water from the bearing and the introduction of abrasive and corrosive substances to the bearing while allowing rotation and oscillation of the sprinkler. However, wind-borne substances as well as mud and sand splashed by adjacent sprinklers have in the past caused premature wearing of the seals used therein. This has necessitated frequent disassembly of each sprinkler for replacement of the seals which is costly and time-consuming and, of course, prevents the most efficient use of the sprinkling system.

In order to avoid such frequent maintenance, various combinations of sealing materials have been employed in an attempt to find bearing seals which are more resistant to wear from abrasive and corrosive substances. Certain combinations have been found to be more resistant to wear while not inhibiting operation of the sprinklers. However, wearing of the seals still occurs at a faster rate than is desirable.

A major factor contributing to the wearing of the seals has been the exposure of the compression spring to the collection of abrasive and corrosive substances. The helical configuration of such springs with gaps between adjacent convolutions lends itself to the accumulation of mud, sand, dirt, and dust so as to retain it adjacent to the seals. This foreign material is susceptible to being worked into the seals during oscillatory and rotational movement of the sprinkler. Thus, the exposure of the compression spring promotes wearing of the seals. Furthermore, such substances can find their way into the interior of the bearing thereby inhibiting or terminating operation of the sprinkler as well as causing excessive wear.

SUMMARY OF THE INVENTION

It is therefore an object of the present invention to provide a compression spring shroud which helps to prevent the wearing of bearing seals in rotary sprinklers.

Another object is to provide a compression spring shroud which prevents the introduction of mud, sand, dirt and dust to the compression springs of rotary sprinklers.

Another object is to provide such a compression spring shroud which does not inhibit the rotation or oscillation of such a rotary sprinkler.

Another object is to provide such a compression spring shroud which flexes with compression and expansion of the compression spring so as not to inhibit its operation.

Another object of the invention is to provide such a compression spring shroud which prevents the intrusion of foreign substances into the interior of the bearing thereby providing a sprinkler of longer operating life.

Another object is to provide such a compression spring shroud which minimizes the necessity for periodic disassembling of rotary sprinklers for cleaning thereof and replacement of the bearing seals.

Another object of the present invention is to provide a compression spring shroud which makes possible a bearing assembly for conventional rotary sprinklers which is substantially impervious to the passage of foreign matter into contact with the operative elements thereof.

Further objects and advantages are to provide improved elements and arrangements thereof in a device for the purposes described which is dependable, economical, durable, and fully effective in accomplishing its intended purposes.

DESCRIPTION OF THE PREFERRED EMBODIMENT

Figures 1, 2, 3, 4:
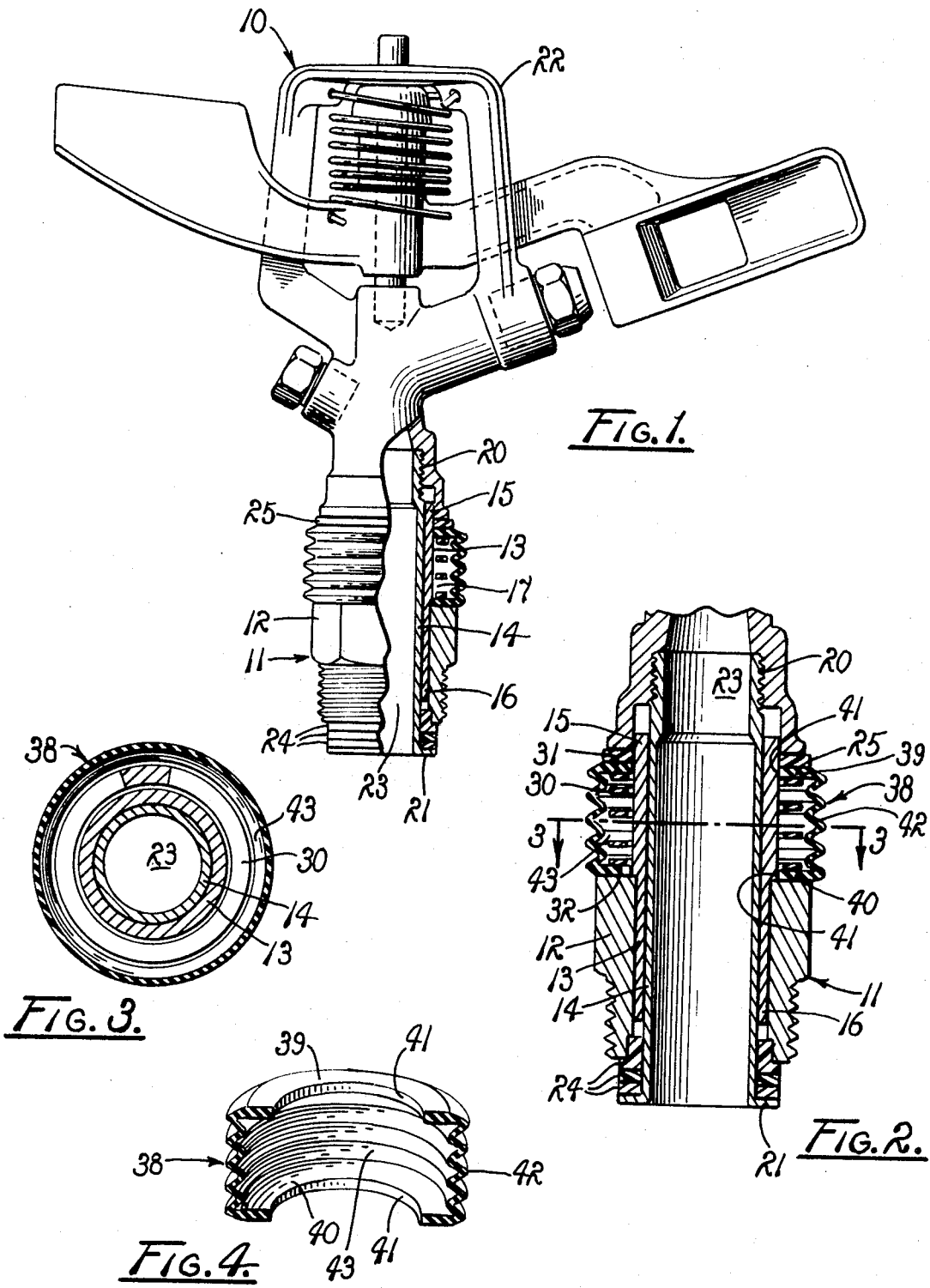
FIG. 1 is a fragmentary side elevation of a conventional rotary sprinkler having the compression spring shroud of the present invention mounted thereon.
FIG. 2 is a somewhat enlarged fragmentary vertical section of the bearing assembly of the rotary sprinkler.
FIG. 3 is a horizontal section, taken at the position represented by line 3—3 of FIG. 2.
FIG. 4 is a perspective vertical section of the compression spring shroud of the present invention.

Referring more particularly to the drawing, FIG. 1 shows a conventional rotary sprinkler, generally indicated by the numeral 10. The sprinkler has a conventional bearing assembly 11. The bearing assembly includes a bearing housing 12 in which is mounted in fixed relation therein a bearing sleeve 13. A hollow spindle 14 is mounted for rotational movement in the bearing sleeve. The bearing sleeve has an upper end 15 and a lower end 16. Adjacent to the upper end and concentrically of the bearing sleeve is a spring recess 17.

The hollow spindle 14 has an upper threaded end 20 and an opposite flanged lower seal end 21, both of which extend relatively short distances beyond the upper end 15 and the lower end 16 of the bearing sleeve 13. A conventional rotary discharge member or sprinkler head 22 is threadably received on the upper threaded end of the spindle 14. The spindle has a water conduit 23 extending longitudinally therethrough from the lower seal end 21 through the upper threaded end 20 which communicates in the conventional manner through the sprinkler head. A first sealing means or first bearing seal 24 is mounted concentrically about the lower seal end 21 of the spindle 14, as best shown in FIG. 2. The first bearing seal consists essentially of a combination of rubber and plastic seals found to be durable and most resistant to wear, such as that shown in U.S. Pat. No. 2,980,341. A second bearing seal 25 is mounted concentrically about the bearing sleeve within the spring recess 17 adjacent to the sprinkler head 22.

A helical compression spring 30 is mounted concentrically about the bearing sleeve 13 within the spring recess 17 below the second bearing seal 25, as best shown in FIG. 2. The compression spring has an upper contact surface 31 and a lower contact surface 32 which are the opposite ends of the helically wound compression spring. The compression spring maintains the hollow spindle 14 in an upwardly extended position within the bearing sleeve 13 and the bearing housing 12. In this relationship, both the first and second bearing seals 24 and 25 are retained under slight compression by the compression spring while the sprinkler head 22 is allowed to rotate and oscillate during normal operation thereof.

The enclosure or compression spring shroud of the present invention is generally indicated by the numeral 38. The compression spring has an annular radially inwardly extended upper flange 39 and an annular radially inwardly extended lower flange 40. Both flanges have a central passage 41 extending axially therethrough. Maintaining the flanges in flexibly spaced relation and extending peripherally around the flanges is a transversely accordion pleated tubular wall 42. The shroud may be constructed of any durable flexible material but is preferably constructed of a plastic material. The flanges and accordion-like wall of the shroud define a spring enclosure or chamber 43.

The shroud 38 is mounted circumferentially about the bearing sleeve 13 within the spring recess 17 so that the compression spring 30 is received in the spring enclosure 43. The upper flange 39 is positioned in sealing relation between the upper contact surface 31 of the spring and the second bearing seal 25 and the lower flange 40 is positioned in sealing relation between the lower contact surface 32 of the spring and the bearing housing 12, as best shown in FIG. 2. In this configuration, the compression spring is sealed from exposure to abrasive or corrosive substances.

OPERATION

The operation of the described embodiment of the present invention is believed to be clearly apparent and is briefly summarized at this point. In the conventionally recognized manner, an irrigation system having a plurality of rotary sprinklers 10 mounted in spaced relation thereon is positioned in an area to be irrigated. Each of the sprinklers has a compression spring shroud 38 of the present invention installed thereon, as already described. Upon activation of the irrigation system, water under pressure is supplied to each of the rotary sprinklers so that water is caused to pass under pressure through water conduit 23 of the hollow spindle 14 and out through the sprinkler head 22 in the normal manner. This causes oscillatory and rotational movement of the sprinkler head in the conventional manner to spray water in predefined overlapping spray patterns.

As the sprinkler head 22 is caused to rotate and/or oscillate within the bearing sleeve 13, the compression spring 30 flexes to absorb such movement of the sprinkler head while maintaining the first bearing seal in sealing engagement between the lower end 16 of the spindle and the lower end of the bearing sleeve 13 and the second bearing seal 25 in sealing relation to the sprinkler head. When the compression spring is caused to flex, either during operation or when the water is shut off, the compression spring shroud 38, with its accordion-like wall 42, is caused to flex with the compression spring so that the action of the spring is not inhibited by the presence of the shroud.

It will clearly be seen that any foreign substances borne by the wind, or sand splashed from adjacent sprinkler heads 22 is not permitted to penetrate into the compression spring 30 due to the presence of the shroud 38 mounted in sealing relation thereto. Such foreign substances are thus caused either to pass by the sprinkler head or to adhere to the exterior surface of the bearing assembly 11. In either event, it will be seen that such foreign substances are not collected by the helical compression spring and therefore are not worked into the second bearing seal 25 or into the bearing sleeve 13, as in conventional rotary sprinklers. Consequently, wearing of the second bearing seal 25 and inhibiting of the operation of the sprinkler due to the admission of foreign substances to the bearing sleeve is minimized by the use of the compression spring shroud of the present invention. Furthermore, the upper and lower flanges, being constructed preferably of a plastic material, operate as additional bearing seals to facilitate rotation of the sprinkler head.

Therefore, such rotary sprinklers having the shroud 38 of the present invention do not need to be disassembled for replacement of the seals or cleaning of the interiors of the sprinklers nearly as frequently as with conventional sprinklers. Operational life is greatly extended with a simultaneous reduction in the cost of the operation of such an irrigating system.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a sprinkler assembly adapted for connection to a source of fluid under pressure having a unitary bearing housing and bearing sleeve, a hollow spindle rotatably received in the bearing sleeve and having ends extending beyond the sleeve, the spindle having a first sealing means at one end thereof and an opposite end, a discharge member mounted on said opposite end for rotation with the spindle, a second sealing means disposed about the sleeve adjacent to the discharge member, and resilient means having opposite ends positioned about the sleeve and extended between the second sealing means and the bearing housing urging the spindle endwardly in the sleeve toward the discharge member to hold the first sealing means under compression; an elastic shroud extended between the housing and the second sealing means having opposite ends disposed against opposite ends of the resilient means and extending in shielding relation between said housing and second sealing means to resist intrustion of abrasive and corrosive substances thereby to minimize wearing of the sealing means, spindle and sleeve.

2. The sprinkler assembly of claim 1 in which the shroud is transversely accordian pleated to accommodate expansion and contraction of the resilient means.

3. In a bearing assembly for the discharge of fluid under pressure therethrough having relatively rotating axially slidable tubular elements providing juxtaposed circumscribing annular shoulders, and having means for resisting leakage of fluid from between said elements and for limiting axial slidable movement of said elements from each other; means for resisting intrusion of external abrasives and other contaminants between said elements when they are not internally pressurized comprising an annular elastic shroud circumscribing said elements, extended between said shoulders and having integral flanges at opposite ends thereof individually disposed in facing relation to said shoulders, and resilient means disposed under compression between said flanges urging the flanges toward their respective facing shoulders in substantially abrasive-tight interconnection between the elements.

4. The resisting means of claim 3 on which the resilient means is a helical spring circumscribing at least one of said elements.

5. The resisting means of claim 3 including an annular anti-friction seal disposed between one of the flanges of the shroud and its respectively facing shoulder to facilitate relative rotational movement therebetween.

6. The resisting means of claim 3 in which the shroud is transversely accordian pleated to facilitate elongation and contraction of the spring as the elements slide relatively axially of each other.

7. A bearing assembly for the discharge of fluid under pressure therethrough comprising a housing having an inwardly disposed bearing and opposite ends providing annular oppositely axially disposed thrust surfaces circumscribing the bearing; a tubular spindle rotatably mounted in the bearing having an end endwardly extended from the housing and an opposite end, said extended end being circumscribed by a radially extended flange disposed in spaced relation to an adjacent annular thrust surface of the housing; an annular seal disposed between said adjacent thrust surface and the flange; a tubular discharge member connected to said opposite end of the spindle providing an annular axially disposed shoulder in spaced relation to an adjacent annular thrust surface of the housing; a coiled compression spring circumscribing the housing disposed under compression between the annular shoulder of the discharge member and the adjacent annular thrust surface of the housing resiliently to hold the seal under compression between the flange and its adjacent thrust surface; and an elastic shroud for minimizing the intrusion of external abrasives having an inwardly extended annular flange disposed between the spring and the adjacent annular surface of the housing, a central portion continuous with the flange and circumscribing the spring, and an inwardly extended annular flange continuous with the central portion disposed between the shoulder of the discharge member and the spring.

8. The bearing assembly of claim 7 in which the central portion of the shroud is transversely accordian pleated to facilitate longitudinal stretching and contraction with the spring.

9. The bearing assembly of claim 7 including an annular bearing seal between the shoulder of the discharge member and the adjacent inwardly extended annular flange of the shroud to facilitate relative rotational movement of the discharge member and the shroud.

* * * * *